April 10, 1956 A. WEISSENBORN 2,741,261
APPARATUS FOR REGULATING THE FLOW OF A GAS MIXTURE
Filed Feb. 4, 1952
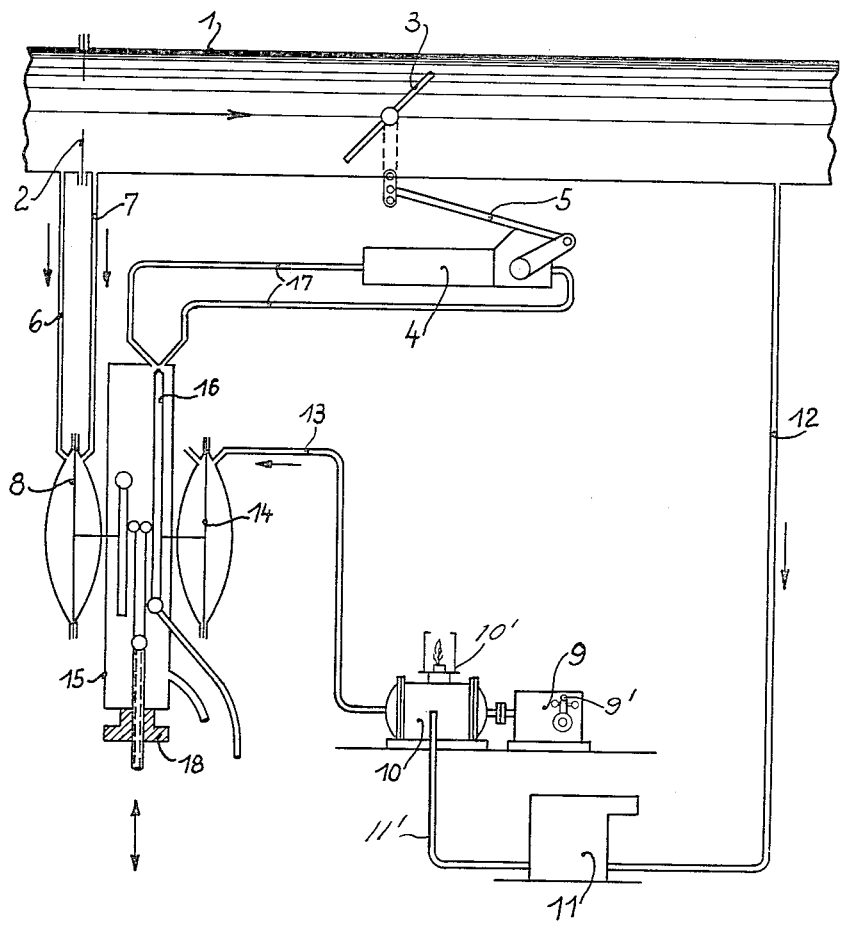
ADOLF WEISSENBORN
Inventor.
By Thomas J. P. O'Brien
Attorney.

United States Patent Office 2,741,261
Patented Apr. 10, 1956

2,741,261

APPARATUS FOR REGULATING THE FLOW OF A GAS MIXTURE

Adolf Weissenborn, Essen, Germany, assignor, by mesne assignments, to Koppers Company, Inc., Pittsburgh, Pa., a corporation of Delaware Application February 4, 1952, Serial No. 269,871

3 Claims. (Cl. 137—486)

The present invention relates to an apparatus for regulating a flow of heating gas for industrial furnaces, such as for example, coking ovens, and in particular to an apparatus for regulating the rate of flow of a mixture of gases, the calorific value of which is regulated, having a fluctuating specific weight.

For heating industrial furnaces or ovens, such as coking ovens or the like, a heating gas with a strongly varying calorific value is frequently available. When employing for example, residual gas from the synthesis of ammonia or hydrocarbons the calorific value may vary within wide limits, such as between 315–630 B. t. u./cubic foot 60° F. 30″. The adjustment of the calorific value to a desired value is customarily effected by the admixture of a gas with a small but comparatively constant heating value, such as for example blast furnace gas (about 105 B. t. u./cubic foot 60° F. 30″). The controlled calorific value mixed gas thereby resulting exhibits however, in some circumstances, a strongly varying specific gravity, in accordance with the ratio of residual gas to blast furnace gas in the mixture. A simple pressure regulation of the mixed gases would accordingly bring to the furnace, instead of a constant volume, a varied volume or quantity of gas, varied in accordance with the change in the specific gravity, as the members (pressure regulators) regulating the stream of mixed gas is well known also to correspond to the fluctuations of the specific gravity of the gas stream.

The invention solves the problem of providing an apparatus, comparatively simple to operate, in which the regulation of a stream of mixed gases can be carried out despite the specific weight of the gas varying within wide limits.

The apparatus for regulating the flow of a gas mixture of a calorific-value-regulated gas mixture with a varying specific gravity consists of a double diaphragm regulator, well known in itself, which acts through a control cylinder on a throttle member in the main gas conduit. According to the invention one diaphragm is acted upon by the pressure differential, dependent on the specific gravity of the gas, occurring in a normal blend at a throttle diaphragm in the main gas conduit, while the other diaphragm of the double diaphragm regulator is acted upon by a counter pressure which is to depend only on the specific gravity of the gases regulated in accordance with the flow of the mixture, and which counterpressure is produced by a blower running at constant speed and continuously withdraws gas from the regulated main gas stream.

It is well known that for a gas mixture flow V the following equation is applicable:

$$V = k\frac{\sqrt{h}}{\alpha}$$

in which $h$ indicates the pressure differential in a normal blend at a throttle diaphragm proportionally dependent on the specific gravity of the gas, $\alpha$ is the specific weight of the gas, $k$ is an apparatus constant which inter alia depends on the pipe diameter and the amount of the normal blend. The stream V of the gas mixture in accordance with the above equation thus remains constant if the ratio $h/\alpha$ remains constant. The blower provided according to the invention produces a gas pressure which, assuming a constant speed of rotation of the blower and constant pressure of gas thereto, is likewise proportional to, but will vary solely with the variation in, the specific gravity at a constant speed of rotation of the blower. The more constant is the rotation of the blower the better remains the ratio $h/\alpha$, i. e. the stream of the gas mixture remains constant. This pressure of the blower is used to cancel out, or neutralize, or equal, the specific gravity factor in the regulating operation, thus leaving the regulation of the control cylinder on the throttle member solely responsive to the effect of the pressure differential, and solely proportional to the alteration of the pressure on the gas, at the throttle diaphragm. If the absolute value of V is to be altered, this may be effected in a comparatively simple manner according to the invention by varying the rate of rotation of the blower, as by use of a multispeed drive for the blower, and, accordingly the absolute value of the counter pressure with a constant pressure difference $h$. The revolution regulator 9′, such as an electric switch, of the blower is for this purpose calibrated in gas mixture flow values.

Another possible way of altering the absolute value of V, according to the invention, consists in having the double diaphragm system acting on a known type of ratio regulator (German Patent 352,960). The rate of revolution of the blower can then be kept constant all the time (synchronous motor). The variation at will of the ratio $h/\alpha$ and accordingly of the value of V is then made by a corresponding adjustment at the ratio value.

The invention will be more particularly described with reference to an example of construction illustrated in the drawing. The calorific-value-regulated mixed gas, showing a fluctuating specific gravity from the specific gravity contemplated as that factor for the normal blend flows through the main gas pipe 1 in the direction of the arrow. In the main gas pipe between the inlet and outlet thereto there is a throttle valve 2 constituted of a diaphragm in the form of an orifice plate, for producing a pressure differential $h$ in the normal blend of gas across the throttle valve 2, and a throttle valve 3 regulating the stream of mixed gas, which valve 3 is itself actuated by a control cylinder 4 through a lever system 5. The pressure differential $h$ resulting at the throttle diaphragm 2 is supplied through the pressure conduits 6 and 7 to the diaphragm 8 of a double diaphragm regulator.

The blower 10, which may be in the form of a chamber with propeller or fan blade therein, driven by a motor 9, having two or more speeds, but rotating at a constant speed at any selected speed, continuously sucks into the blower 10, by induction line 11′, and discharges therefrom, to pilot flame eduction line 10′, a stream of gas from the main gas conduit 1, through the first pressure equalizer regulator 11, via the pipe 12, and in so doing produces a pressure $p$ on the gas in blower 10 which pressure is transmitted, through the pipe 13, as a pressure $p$ at the diaphragm 14 of the double diaphragm regulator 15. As blower 10 rotates at a constant speed, it takes in and discharges a constant volume of gas per revolution by means of lines 11′ and 10′. Regulator 11 being larger than lines 11′ and 12, expands therein the gas from line 12, thus insuring that the pressure of gas entering line 11′ and blower 10 is always constant regardless of variation in the pressure of the gas in line 12. Consequently, line 13 shows only the variation in pressure due to changes in the density of gas from line 12, so that diaphragm 14 is therefore dependent for variation solely on the specific gravity of the mixture of gas from line 9, and hence varies in amount solely with variation in the specific gravity. Any pressure change, due solely to change in specific gravity, that occurs in 15 by impulse on membrane 8, is counteracted by an equal impulse on membrane 14. Hence, 15 and 17, and 4, and then 3 respond solely to the effect of the pressure differential or rate of flow ahead of orifice plate 2.

The diaphragms 8 and 14 control the position of the flow pipe 16 of the double diaphragm regulator 15, constructed in the known manner as a ratio regulator, so that depending on whether the pressure $p$ at 14 produced by the blower 10 or the differential pressure $h$ at 8 is the greater, the flow pipe 16 forces oil under pressure through the oil pressure pipe 17 either into the left or the right half of the control cylinder 4.

The absolute value of the flow of gas mixture V, i.e. the middle position of the throttle valve 3 with a constant specific gravity of the gas is varied in the known manner by moving up or down the fulcrum of the lever system of the ratio regulator by rotation of the adjusting screw 18.

Instead of using the ratio regulator with a multiple lever transmission a simple double diaphragm regulator can be used, in which both diaphragms act directly, without an adjustable lever transmission, on the flow pipe. The absolute value of the flow of mixed gas V is in this case adjusted by alteration of the speed of rotation of the blower.

I claim:

1. In apparatus for regulating the flow of a constant flow of a gas mixture of gases which vary in specific gravity, at a regulated calorific value and a predetermined constant volume, comprising: the combination with a main gas pipe having therein, between a gas inlet thereto and a gas outlet therefrom, a main throttle diaphram and a throttle member downstream thereof, a double diaphragm regulator connected to the throttle member for controlling the same to control the volume of gas passing from the main, and with one of the diaphragms of the regulator being connected to the main to be operated by the differential pressure which occurs at the throttle diaphragm, said differential pressure being dependent on the rate of flow, and proportionally dependent on the specific gravity, of the gas mixture; of a blower which is operable with a predetermined constant speed, is connected through a first gas pressure regulator to said main gas pipe, downstream of said throttle member, to receive gas therefrom continuously, and has an eduction outlet for continuous discharge of gas withdrawn thereby, said blower also being connected to the other diaphragm of the double diaphragm regulator to supply thereto, as a counter pressure, a resultant pressure developed by the blower and proportionally dependent solely on the specific weight of the gas withdrawn from said main gas pipe, as a result of the continuous withdrawal, through said first gas pressure regulator, of gas from the main gas pipe by the blower while operable at a constant speed.

2. Apparatus as claimed in claim 1, and in which the blower is of the type that is adjustable for alteration of its speed of rotation, whereby the adjustment of the theoretical flow value of the gas mixture stream at a constant speed of rotation of the blower may be effected by regulation of the rate of speed at constant speed or rotation of the blower.

3. Apparatus as claimed in claim 1 and in which the double diaphragm regulator comprises a ratio regulator having a range of regulation which is variable, with a constant speed of rotation of the blower, by means of an adjusting screw.

References Cited in the file of this patent

UNITED STATES PATENTS

| 2,074,882 | Wunsch | Mar. 23, 1937 |
| 2,295,728 | Gess | Sept. 15, 1942 |
| 2,330,654 | Ziebolz | Sept. 28, 1943 |

FOREIGN PATENTS

| 546,495 | Germany | Mar. 14, 1932 |